United States Patent [19]

Karbassiyoon et al.

[11] Patent Number: 4,632,684
[45] Date of Patent: Dec. 30, 1986

[54] METHOD OF AND APPARATUS FOR MAKING OPTICAL PREFORMS FROM TUBULAR BODIES

[75] Inventors: Kamran Karbassiyoon, Roanoke; Philip E. Foster, Botetourt; Francis I. Akers; Daniel G. Fletcher, both of Roanoke, all of Va.

[73] Assignee: ITT Corporation, New York, N.Y.

[21] Appl. No.: 636,210

[22] Filed: Jul. 31, 1984

[51] Int. Cl.$^4$ .................. C03B 37/012; C03B 37/07
[52] U.S. Cl. ........................................ 65/2; 65/3.12; 65/110; 65/161
[58] Field of Search ............... 65/3.11, 2, 18.2, 110, 65/161, 29, 3.12

[56] References Cited

U.S. PATENT DOCUMENTS

| | | | |
|---|---|---|---|
| 3,035,371 | 5/1962 | Mouly | 65/161 |
| 4,165,224 | 8/1979 | Irven | 65/110 X |
| 4,278,459 | 7/1981 | Partus | 65/18.2 |
| 4,389,229 | 6/1983 | Jang | 65/18.2 X |

*Primary Examiner*—Kenneth M. Schor
*Attorney, Agent, or Firm*—John T. O'Halloran; Robert P. Seitter; Mary C. Werner

[57] ABSTRACT

An arrangement for collapsing tubular formations into optical preforms includes a control arrangement which controls the pressure build-up at the downstream end of the tubular formation during all of but the last one of the collapsing increments to control the flow of a gaseous medium through the interior of the tubular formation from an upstream end to and beyond the downstream end of the tubular formation. The magnitude of the back-up pressure is controlled by a set point controller in dependence on the actual value of the back-up pressure, the set point controller being operative for counteracting any deviation from the desired pressure. The set point controller controls the flow-through cross-section of a control valve that admits a pressurized inert gas to a region situated downstream of the downstream end of the tubular formation and also downstream of the point at which the pressure build-up is being measured.

4 Claims, 1 Drawing Figure

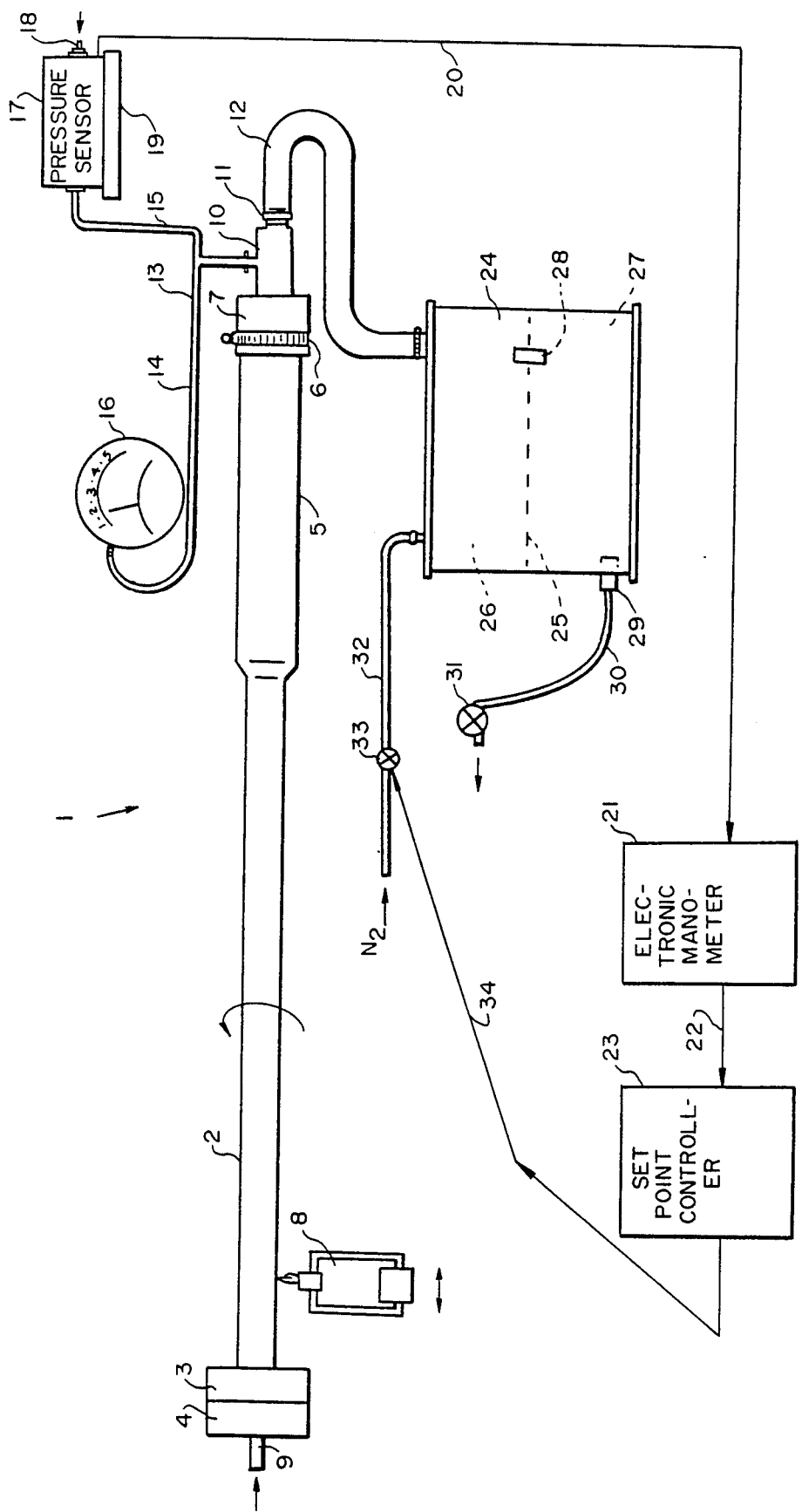

METHOD OF AND APPARATUS FOR MAKING OPTICAL PREFORMS FROM TUBULAR BODIES

BACKGROUND OF THE INVENTION

The present invention relates to the manufacture of optical fibers in general, and more particularly to a optical preforms from tubular bodies. '

There are already known various methods of, and arrangements for, producing optical fibers, most of which involve first the production of an optical preform and then the drawing of the optical fiber from the preform. One way of producing the optical preform is the modified chemical vapor deposition method, during the preformance of which a gaseous medium is caused to flow through the , interior of a tubular substrate body. The gaseous medium includes reactants which decompose or interreact or are otherwise chemically transformed when heated to transformation temperatures into solid glass constituents. The tubular substrate is locally heated from the outside and the heating zone is gradually moved longitudinally and/or circumferentially of the tubular substrate, resulting in transformation of the reactants into the glass constituents, precipitation of the glass constituents from the gaseous medium in the form of glass soot and deposition of such glass soot on the internal surface of the tubular substrate and subsequent fusing of the deposited glass soot with tne substrate and/or any previously deposited internal layers. The modified chemical vapor deposition process is conducted in a plurality of passes or increments. The composition of the gaseous medium can be changed from one pass to another so as to change the chemical composition and the optical properties of the consequtively deposited layers of glass. After the deposition operation is completed, the resulting glass formation, which is still tubular, is often caused to collapse into a solid cross-section optical glass preform, which is subsequently used in the optical fiber drawing operation.

It has been established that it is advantageous to maintain positive pressure in the interior of the tubular formation during the collapsing operation in order to maintain roundness of the formation as it is being collapsed, usually in plurality of increments or passes. Prior to the present invention, however, this has been usually achieved in a static manner, without any flow of gaseous medium through the internal passage of the tubular formation during the collapsing operation. Rather, continuous flow out of one end of the passage in the tubular formation was prevented in one way or another, and gaseous medium at the desired superatmospheric pressure was supplied to the other end of the passage, so that this desired superatmospheric pressure prevailed throughout the internal passage. Experience with this kind of an approach has shown, however, that the pressure differential between the exterior and the interior of the tubular formation fluctuates during the collapsing operation, which brings about irregularities in the collapsing process. Moreover, at the relatively high temperatures used during the collapsing process, a substantial proportion of dopants such as germania will evaporate from the innermost layers of the tubular formation, thus changing the optical properties of such layers. Thus, a pronounced dimple is produced in the reflective index characteristic of the core of the preform and thus of the fiber drawn from the latter, unless the affected layer or layers are removed by etching just prior to the last collapsing step. The presence of such a pronounced dimple will degrade the optical properties of the optical fiber, but the etching away of the innermost layer or layers is a time consuming operation so that it is preformed only in the manufacture of preforms for very high-quality optical fibers.

SUMMARY OF THE INVENTION

Accordingly, it is a general object of the present invention to avoid the disadvantages of the prior art.

More particularly, it is an object of the present invention to provide a method of making optical fiber preforms and more particularly of collapsing tubular formation into such preforms which does not possess the disadvantages of the known methods of this type.

Still another object of the present invention is to devise a method of the above type which is effective for keeping the deterioration of the optical properties of the innermost layers of the tubular formation during the collapsing operation to a minimum, if not eliminating such deterioration altogether.

A concomitant object of the present invention is to develop an apparatus especially suited for performing the above method.

It is yet another object of the present invention so to construct an apparatus of the above type as to be simple in construction, inexpensive to manufacture, easy to use, and reliable in operation nevertheless.

In pursuance of these objects and others which will become apparent hereafter, one feature of the present invention resides in a method of making optical fiber preforms, this method comprising the steps of producing a respective tubular glass body of desired optical properties that bounds a through passage; collapsing the tubular body into the preform in a plurality of collapsing increments during the last one of which the passage is eliminated; and maintaining a flow of a gaseous medium through the passage at a predetermined pressure exceeding ambient pressure during at least one of the collapsing increments of the collapsing step preceding the last collapsing inclement.

According to another aspect of the present invention there is provided an apparatus for converting tubular glass bodies having respective through passages into optical fiber preforms, this apparatus comprising, according to the present invention, means for supporting the respective tubular glass bodies; means for applying heat to the exterior of the respective tubular glass body at least during a collapsing operation to cause the respective tubular glass bodies to collapse in a plurality of collapsing increments during the last one of which the respective passage is eliminated; and means for maintaining a flow of a gaseous medium through the respective passage at a predetermined pressure exceeding ambient pressure during at least one of the collapsing increments preceeding the last collapsing increment.

BRIEF DESCRIPTION OF THE DRAWING

Above-mentioned and other features and objects of this invention will become apparent by reference to the following description taken in conjunction with the accompanying drawing, in which the sole FIGURE is a somewhat diagrammatic representation of an apparatus equipped according to the present invention for collapsing tubular formations into optical preforms in accordance with this invention.

DESCRIPTION OF THE PREFERRED EMBODIMENT

Referring now to the drawing in detail, it may be seen that the reference numeral 1 has been used to identify an apparatus equipped in accordance with the present invention in its entirety. The apparatus 1 is operative for collapsing a tubular formation 2 into a solid cross-section optical preform. The tubular formation 2 is supported in a holder or chuck 3 which, in turn, is mounted for relative rotation on a stationary support 4. The end of the tubular formation 2 which is remote from the chuck 3 merges into an exhaust pipe 5 which, in turn, is rotatably mounted, by means of rotary union 6 of a conventional construction, on a stationary support 7. During the collapsing operation, the chuck 3 rotates the tubular formation 2, together with the exhaust pipe 5, about the axis of the tubular formation 2, while the rotary union 6 provides for a substantially leakagefree communication between the interior of the exhaust pipe 5 and the interior of the support 7.

A heating device 8, such as an oxyhydrogen burner, is mounted for movement in the directions indicated by a double-headed arrow, along the tubular formation 2 substantially between the chuck 3 and the region of merger of the tubular formation 2 with the exhaust pipe 5. A gaseous medium at a predetermined superatmospheric pressure is introduced through an inlet pipe 9 into the interior of the tubular formation 2 during at least some but preferably all but the last one, of the increments of the collapsing operation which is induced, in a well-known manner, by the heating action of the heating device 8. As well-known in the art, the heating device 8 is moved along the tubular formation 2 during each of the collapsing increments or passes, resulting in incremental reduction of the inner and outer diameters of the tubular formation 2, until the internal passage present in the tubular formation 2 is completely eliminated during the last collapsing increment and the tubular formation 2 is converted into a solid rod or optical preform.

As described so far, the apparatus 1 is of a known construction as frequently used in the optical fiber manufacturing field so that it is deemed not to be necessary to describe this construction here in any greater detail. Suffice it to say that the support 7 is hollow and is provided with a hollow connecting portion 10 to which there is connected, by means of a connecting arrangement 11 of any conventional construction, a connecting conduit 12 which is shown to be constituted by a flexible hose. The pressure prevailing in the interior of the hollow portion 10 is admitted to a conduit 13 which is shown to have two branches 14 and 15. The branch 14 leads to a reference gauge 16 which is constructed, for instance, as magnahelic measuring device of a conventional construction. On the other hand, the branch 15 leads to a pressure sensor 17 which has an inlet port 18 through which ambient pressure is admitted into the interior of the pressure sensor 17. The pressure sensor 17 is also of a conventional construction which will not be discussed here in any detail, and is operative for comparing the pressure supplied thereto by the branch conduit 15 with the ambient pressure entering the same through the port 18, and for generating an electrical signal representative of the result of the comparison of these two pressures, preferably their difference. The pressure sensor 17 is preferably of the type known as a barocell pressure sensor and is mounted on a thermal base 19 in order to reduce or eliminate thermal effects on the electrical output thereof. Tne electrical output of the pressure sensor 17 is supplied to a connecting line 20 which carries this output signal to an electronic manometer 21. The electronic manometer 21 produces an output which is supplied, through a connecting line 22, to a set point controller 23.

The end of the flexible hose 12 which is remote from the connecting arrangement 11 is connected to a port which communicates with the interior of a dead space cylinder 24. The interior of the dead space cylinder 24 is partitioned, by a partitioning wall 25, into two compartments 26 and 27. The compartments 26 and 27 are in limited communication with one another via a restrictor 28 of a predetermined flow-through cross-section. An outlet port 29 communicates the compartment 27 with a discharge conduit 30 that leads to a discharge valve 31 that is capable of controlling the flow through the discharge conduit 30 and discharge of the gaseous medium present in the conduit 30 into the ambient atmosphere. The valve 31 is advantageously constructed as a PVC butterfly valve. A feeding conduit 32 which has an adjustable valve 33 interposed therein communicates with the compartment 26 of the dead space cylinder 24. An inert gas, such as, for instance, nitrogen, is admitted into the conduit 32. A connecting line 34 connects an output of the set point controller 23 with the adjustable valve 33. The valve 33 is adjusted, in dependence on the magnitude of the signal received from the connecting line 34, so as to control the flow of the inert gas through the conduit 32 into the compartment 26.

Having so described the construction of the apparatus 1 according to the present invention, its operation will now be briefly discussed. During the collapsing operation, a gaseous medium at a predetermined pressure is admitted into the interior of the tubular formation 2 through the intake pipe 9. Simultaneously, the inert medium, especially nitrogen, is supplied into the compartment 26 of the dead space cylinder 24. Depending on the degree of opening of the valve 33, pressure will build up in the compartment 26, this pressure build-up prepagating through the flexible hose 12 and the tubular portion 10 of the support 7 into the interior of the exhaust pipe 5. Of course, a part of the contents of the compartment 26 will simultaneously be discharged through the restriction 28 into the compartment 27 and from there through the discharge port 29, the discharge conduit 30 and the discharge valve 31 into the ambient atmosphere. Nevertheless, the afore-mentioned pressure build up will still take place. The pressure sensor 17 detects the excess of this built-up pressure over the ambient pressure and issues an output signal into the line 20 which is fed into the electronic manometer 21 and from there through the connecting line 22 to the set point controller 23. Then, when the pressure prevailing in the tubular portion 10 deviates from that desired, the set point controller 23 issues a signal into the line 34 which causes the valve 33 either to close more or to open more depending on the sense of deviation, such that the throttling effect of the valve 33 is increased when the deviation is upwardly of the desired pressure, and is decreased when the deviation is downwardly of the desired pressure. Simultaneously, the gauge 16 provides a visual indication of the pressure inside the tubular portion of the support 7, enabling the operator of the arrangement 1 to change the values pre-set in the set point controller 23, if need be.

It will be appreciated that the dead space cylinder 24 acts as a pulsation damper in that temporary fluctuations will be dissipated therein. On the other hand, long term trends in the pressure build-up will be detected by the pressure sensor 17 and will be used to control the setting of the flow-through cross-section of the valve 33. Obviously, the pressure in the tubular portion 10 is always below that prevailing in the intake pipe 9, so that flow is established through the tubular formation 2 during the collapsing operation in the direction from the intake pipe 9 to the exhaust pipe 5 and from there through the tubular portion 10, the flexible hose 12, the compartment 26, the restriction 28, the compartment 27, the discharge port 29, and the discharge conduit 31 into the ambient atmosphere.

It was established that, during the collapsing operation, certain dopants, such as germanium, phosphorus or the like, evaporate more readily than the basic silicon material of tne tubular formation 2. Usually, the innermost layer previously deposited in the interior of the tubular substrate to form the formation 2 is the most heavily doped one, since it is desired to have the greatest deviation in its index of refraction from that of silica. Hence, the evaporation of such dopant from this innermost layer results in deterioration of the desired optical properties of this layer and/or several outwardly adjacent layers. To counteract this deleterious occurrence, the medium admitted into the interior of the tubular formation 2 through the intake of pipe 9 during the collapsing operation is of that type which releases the respective dopant or dopants when exposed to heat. This, of course, means that, during the collapsing operation, some of the dopant material will evaporate from the innermost layer and be carried away by the flow of the gaseous medium through the interior of the tubular formation 2 but, at the same time, replenishment amounts of the dopant are formed in the gaseous medium at the region of the heating device 8 inside the tubular formation, these additional amounts of the dopant depositing on the internal surface of the tubular formation 2 downstream of the region of the heating device 8. Hence, the depletion of the dopant or dopants from the innermost layer of the tubular formation 2 is at least partially compensated for. In any event, the loss of the dopant or dopants from the radially outwardly adjoining layers, which would result from the diffusion of the dopant into the innermost layer and evaporation from the latter, is minimized if not eliminated altogether.

According to the present invention, the pressure control described above is preformed during all of the passes of the heating device 8, that is, during all of the collapsing increments which change the tubular formation 2 into a solid cross-section optical preform, except for the last collapsing increment during which the internal passage of the originally tubular formation is eliminated. It will be appreciated that, because of such elimination of the internal passage of the tubular formation, at least locally, at the very outset of the last collapsing step, no flow of the gaseous medium can take place through the interior of the tubular formation 2 and, consequently, the very purpose of the above-discussed pressure control would be defeated.

The dead space cylinder 24 controls the short-term pressure fluctuations. However, experience has shown that, in many instances, the dead-space cylinder 24 and the associated elements can be eliminated without deleteriously affecting the desired build-up of the back-up pressure in the exhaust pipe 5, in that the conduit 32 leads into the interior of the tubular formation 2 and terminates there to cause back-up pressure at this location. Experience has shown that sufficient control of the back-up pressure is obtained even under these circumstances.

While we have decribed above the principles of our invention in connection with specifice apparatus, it is to be clearly understood that this description is made only by way of example and not as a limitation to the scope of our invention as set forth in the objects thereof and in the accompanying claims.

We claim:
1. A method comprising the steps of:
providing a tubular glass body having a through passage and being suitable for use in making optical fiber;
collapsing the tubular body into a solid optical fiber preform by passing heating means along the length of the tubular body a plurality of times so that the diameter of the passage is reduced each time;
supplying a gaseous medium at superatmosphere pressure into one end of the passage and through the passage and discharging the gaseous medium at the other end of the passage through a gas conduit during at least one pass of the heating means;
supplying a pressure control gas at a location downstream of the other end of said passage through said conduit so that the pressure of said control gas acts at said other end of such passage and exerts a back pressure at said other end of said passage on the gaseous medium flowing through said passage;
detecting the difference in pressure between the resulting gas mixture of control gas and gaseous medium downstream of the other end of said passage and the ambient pressure acting on the outside of said tubular member; and
adjusting the supply of said pressure control gas to maintain said pressure difference substantially constant whereby the difference between the gas pressure inside said tubular member and said ambient pressure is also maintained substantially constant.

2. A method in accordance with claim 1 wherein said pressure control gas is supplied to a pulsation damper located downstream of the other end of said passage.

3. A method in accordance with claim 2 wherein said gaseous medium is supplied to said one end of said tubular body during all but the last pass of said heating means.

4. A method in accordance with claim 1 wherein said gaseous medium includes glass forming precursors capable of forming doped silica on the inside of said tubular body and wherein said pressure control gas consists of an inert gas.

* * * * *